Nov. 1, 1955     J. E. ESHBAUGH     2,722,338
FILLER SPOUT CLOSURE
Filed Oct. 15, 1954

INVENTOR
Jesse E. Eshbaugh
BY
Paul Fitzpatrick
ATTORNEY

United States Patent Office 2,722,338
Patented Nov. 1, 1955

2,722,338

FILLER SPOUT CLOSURE

Jesse E. Eshbaugh, Flint, Mich., assignor to General Motors Corporation, Detroit, Mich., a corporation of Delaware Application October 15, 1954, Serial No. 462,587

9 Claims. (Cl. 220—40)

This invention relates to a filler spout closure, and more particularly to a closure for an automobile gasoline tank filler spout.

One feature of the invention is that it provides an improved filler spout closure; another feature of the invention is that it provides a closure including a cap having a base with a locating detent therein, and a spring-thrust washer with a complementary detent for locating the washer in the cap; a further feature of the invention is that it includes a sealing gasket in the cap for sealing the spout and for holding the washer in the cap, the width of the gasket being such that it must be deformed for insertion in the cap.

Other features and advantages will be apparent from the following description and from the drawings, in which.

A conventional closure for the filler spout of an automobile gasoline tank includes a metallic cup-shaped cap which is adapted to be secured over the open end of the filler pipe. In order to prevent leakage when the automobile is in operation a fibrous sealing gasket is held by a rivet in the cap, and spring means in the cap press upon the gasket to seat the gasket upon the rim of the filler spout. In the past it has been the usual practice to rivet the cap, spring and gasket together. This means of assembly has several disadvantages. In the first place, it is costly in that it adds unnecessary parts and riveting operations to the assembly. Furthermore, the rivet limits free movement of the sealing gasket, often resulting in a poor seal and sometimes resulting in excess friction between the gasket and the filler spout rim when the closure is rotated between locked and released positions on the filler spout. This excess friction causes the gasket to wear away and soon become inoperative.

I have devised and am herein disclosing and claiming an improved filler spout closure wherein the parts are loosely assembled without using any rivets or other permanent securing means, and wherein means are provided for centering the parts to insure the proper relative location thereof.

Referring now more particularly to the drawings, 10 is a conventional automobile gasoline tank filler pipe, the open end of which is formed with a circumferential flange 12 to provide a rim 14 upon which the sealing gasket of the closure device seats. At two opposite points around its periphery the flange 12 has notches 16 for use in securing the closure device in conventional manner. Reference may be had to Patent 1,843,128 for a more detailed disclosure of the filler pipe and notches.

Figure 1:
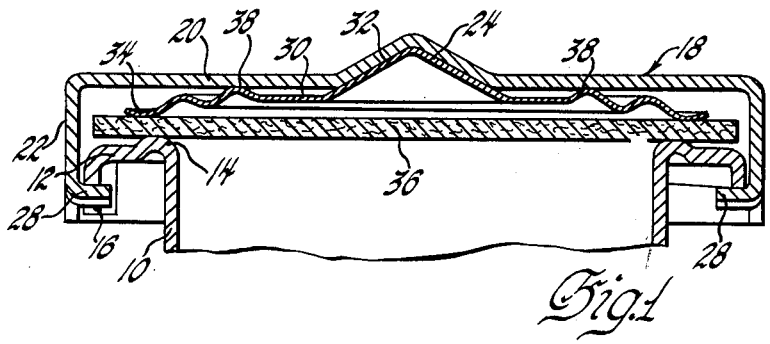
Fig. 1 is a section through the improved filler spout closure mounted on a gasoline tank filler spout.
Figure 2:
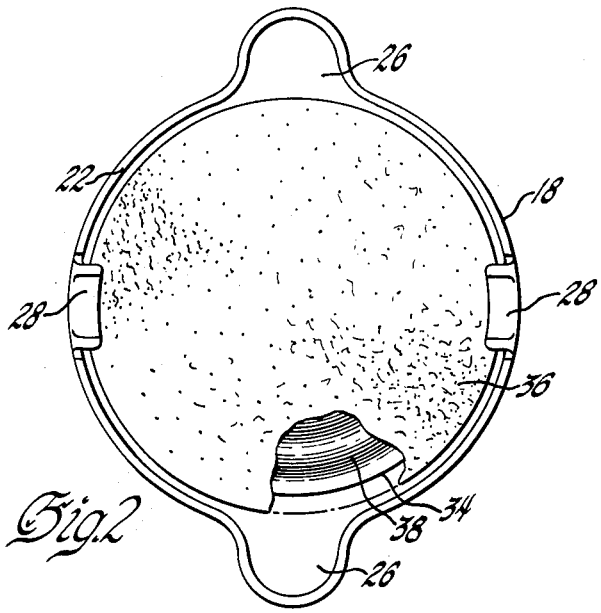
Fig. 2 is a bottom plan view of the closure of Fig. 1, the parts being shown on a smaller scale and being broken away to show underlying structure.

The closure device includes a cup-shaped cap designated generally as 18 and comprising a generally circular base 20 with a circumferential wall 22. As shown best in Fig. 2, at two opposite points along the periphery of the cap there are ears 26 which provide a means for grasping the cap and rotating it between locked and released positions. At the center of the base a locating detent 24 is bent upwardly, or in a direction opposite from the direction in which the wall 22 projects from the base. The circumferential wall 22 has a pair of oppositely located, inwardly directed locking tabs 28 projecting therefrom, and these tabs are adapted to be inserted in the slots 16 in the flange 12 on the filler pipe 10 so that when the cap is rotated it will be locked in position over the open end of the filler pipe. The use of tabs and slots of this conventional type is old.

A dished spring-thrust washer 30 is located in the cap, said washer having a central detent 32 which is complementary to the centering detent 24 of the cap member 18 and which seats in the centering detent for locating the washer in its proper position in the cap. Adjacent its periphery the washer has a circumferential bearing rim 34 upon which is seated a fibrous sealing gasket 36. When the closure device is in use, the spring-thrust washer 30 presses the gasket 36 into tight engagement with the rim 14 of the filler pipe to insure a tight seal.

In the assembly of the closure device the spring-thrust washer 30 is merely dropped into the cap since the diameter of this washer is smaller than the inside diameter of wall 22. The complementary detents 24 and 32 serve to locate the washer in its proper position in the cap. In order to assemble the fibrous sealing gasket 36 in the cap, the gasket is bent or distorted so that it passes the opposite tabs 28. It will be noted that the diameter of the sealing gasket is greater than the distance between the tabs 28 so that the sealing gasket, in addition to its normal sealing function, also serves to hold the washer 30 in place.

This closure device has an absolute minimum of parts and its assembly is simple.

In order to prevent tilting or cocking of the sealing gasket and to insure a strong spring thrust, the washer 30 is provided with an annular ridge 38 which is concentric with the detent 24 and which seats against the inner surface of the base of the cap member.

Figure 3:
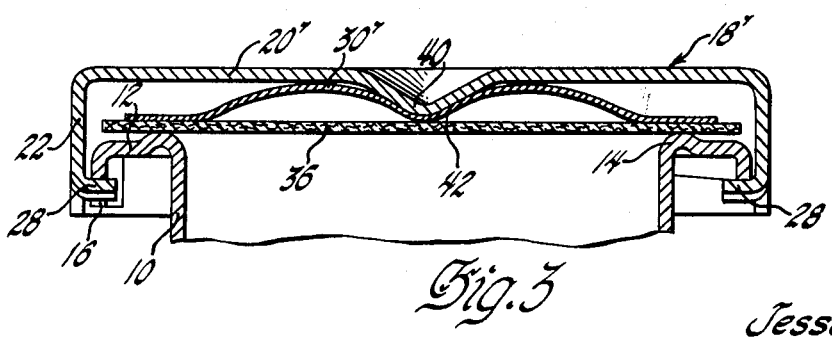
Fig. 3 is a section similar to Fig. 1, but showing a modified form of the invention.

Fig. 3 shows a modified form of the invention in which the cap 18' is provided with a centering detent 40 which is bent from the base 20' in the same direction in which the circumferential wall 22 projects from said base. In this embodiment of the invention, the spring-thrust washer 30' is provided with a detent 42 which is complementary to the centering detent 40 so that the washer is properly held in position. At the same time, the center of the detent 42 touches or lies closely adjacent the center portion of the sealing gasket 36 so that pressure on the center of the gasket 36 will not distort it and cause it to snap out of the cap.

While I have shown and described certain embodiments of my invention, it is capable of many modifications. Changes, therefore, in the construction and arrangement may be made without departing from the spirit and scope of the invention as set forth in the appended claims.

I claim:

1. A filler spout closure of the character described, including: a cap comprising a base with a peripheral wall, the base having a locating detent therein and the wall having at least one pair of oppositely located, inwardly directed locking tabs projecting therefrom; a spring-thrust washer in said cap, said washer having a detent complementary to said locating detent and seating therein for locating the washer in the cap; and a sealing gasket in said cap for sealing said spout and for holding said washer in said cap, the width of said gasket being greater than the distance between said opposite locking tabs.

2. A filler spout closure of the character described, including: a cup-shaped cap comprising a base with a peripheral wall; the base having a locating detent therein and the wall having at least one pair of oppositely located, inwardly directed locking tabs projecting therefrom; a dished spring-thrust washer in said cap, said washer having an annular bearing rim and having a detent complementary to said locating detent and seating therein for locating the washer in the cap; and a fibrous sealing gasket seating on said bearing rim in said cap for sealing said spout and for holding said washer in said cap, the width of said gasket being greater than the distance between said opposite locking tabs.

3. A filler spout closure of the character described, including: a cup-shaped cap comprising a base with a peripheral wall, the base having a centering detent therein and the wall having at least one pair of oppositely located, inwardly directed locking tabs projecting therefrom; a dished spring-thrust washer in said cap, said washer having an annular bearing rim and having a detent complementary to said centering detent and seating therein for locating the washer in the cap, the width of the washer being smaller than the distance between the opposite locking tabs; and a fibrous sealing gasket seating on said bearing rim in said cap for sealing said spout and for holding said washer in said cap, the width of said gasket being greater than the distance between said opposite locking tabs.

4. A filler spout closure of the character described, including: a cup-shaped cap comprising a generally circular base with a circumferential wall, the base having a centering detent therein and the wall having at least one pair of oppositely located, inwardly directed locking tabs projecting therefrom; a dished spring-thrust washer in said cap, said washer having a circumferential bearing rim and having a detent complementary to said centering detent and seating therein for locating the washer in the cap, the width of the washer being smaller than the distance between said opposite locking tabs; and a fibrous sealing gasket seating on said bearing rim in said cap for sealing said spout and for holding said washer in said cap, the width of said gasket being greater than the distance between said opposite locking tabs.

5. A filler spout closure of the character described, including: a cap comprising a base with a peripheral wall, the base having a locating detent bent therefrom in a direction opposite from the direction in which said wall projects from said base, and the wall having at least one pair of oppositely located, inwardly directed locking tabs projecting therefrom; a spring-thrust washer in said cap, said washer having a detent complementary to said locating detent and seating therein for locating the washer in the cap; and a sealing gasket in said cap for sealing said spout and for holding said washer in said cap, the width of said gasket being greater than the distance between said opposite locking tabs.

6. A filler spout closure of the character described, including: a cup-shaped cap comprising a base with a peripheral wall, the base having a locating detent bent therefrom in the same direction in which said wall projects from said base, and the wall having at least one pair of oppositely located, inwardly directed locking tabs projecting therefrom; a dished spring-thrust washer in said cap, said washer having a detent complementary to said centering detent and seating therein for locating the washer in the cap; and a fibrous sealing gasket in said cap for sealing said spout and for holding said washer in said cap, the width of said gasket being greater than the distance between said opposite locking tabs.

7. A filler spout closure of the character described, including: a cup-shaped cap comprising a generally circular base with a circumferential wall, the base having a centering detent bent therefrom in a direction opposite from the direction in which said wall projects from said base, and the wall having at least one pair of oppositely located, inwardly directed locking tabs projecting therefrom; a dished spring-thrust washer in said cap, said washer having a circumferential bearing rim and having a detent complementary to said centering detent and seating therein for locating the washer in the cap, the width of the washer being smaller than the distance between said opposite locking tabs; and a fibrous sealing gasket seating on said bearing rim in said cap for sealing said spout and for holding said washer in said cap, the width of said gasket being greater than the distance between said opposite locking tabs.

8. A filler spout closure of the character described, including: a cup-shaped cap comprising a generally circular base with a circumferential wall, the base having a centering detent bent therefrom in the same direction in which said wall projects from said base, and the wall having a least one pair of oppositely located, inwardly directed locking tabs projecting therefrom; a dished spring-thrust washer in said cap, said washer having a circumferential bearing rim and having a detent complementary to said centering detent and seating therein for locating the washer in the cap, the width of the washer being smaller than the distance between said opposite locking tabs; and a fibrous sealing gasket seating on said bearing rim in said cap for sealing said spout and for holding said washer in said cap, the width of said gasket being greater than the distance between said opposite locking tabs.

9. A filler spout closure of the character described, including: a cap comprising a base with a peripheral wall, the base having a centering detent bent therefrom in a direction opposite from the direction in which said wall projects from said base, and the wall having at least one pair of oppositely located, inwardly directed locking tabs projecting therefrom; a spring-thrust washer in said cap, said washer having a detent complementary to said centering detent and seating therein for locating the washer in the cap, and said washer having an annular ridge concentric with said detent and seating on the inner surface of said base; and a sealing gasket in said cap for sealing said spout and for holding said washer in said cap, the width of said cap being greater than the distance between said opposite locking tabs.

No references cited.